(12) United States Patent
Tanaka et al.

(10) Patent No.: US 9,983,343 B2
(45) Date of Patent: May 29, 2018

(54) DECORATIVE LIGHTING APPARATUS

(71) Applicant: TOYODA GOSEI CO., LTD., Kiyosu-shi (JP)

(72) Inventors: Yoshiharu Tanaka, Kiyosu (JP); Yuki Kuramitsu, Kiyosu (JP); Shinichi Ogawa, Nagoya (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days. days.

(21) Appl. No.: 15/217,725

(22) Filed: Jul. 22, 2016

(65) Prior Publication Data
US 2017/0023723 A1 Jan. 26, 2017

(30) Foreign Application Priority Data

Jul. 23, 2015 (JP) ................................. 2015-145535

(51) Int. Cl.
| | |
|---|---|
| *F21V 8/00* | (2006.01) |
| *F21S 8/10* | (2006.01) |
| *B60Q 1/26* | (2006.01) |
| *B60Q 1/00* | (2006.01) |
| *F21Y 115/10* | (2016.01) |
| *B60Q 3/64* | (2017.01) |
| *B60Q 3/78* | (2017.01) |

(52) U.S. Cl.
CPC ......... *G02B 6/0045* (2013.01); *B60Q 1/0035* (2013.01); *B60Q 1/2661* (2013.01); *B60Q 1/2696* (2013.01); *F21S 48/00* (2013.01); *B60Q 3/64* (2017.02); *B60Q 3/78* (2017.02); *F21Y 2115/10* (2016.08)

(58) Field of Classification Search
None
See application file for complete search history.

(56) References Cited

U.S. PATENT DOCUMENTS

2014/0218951 A1* 8/2014 Takada ................ F21S 48/1291
362/511

FOREIGN PATENT DOCUMENTS

JP 2014-154298 A 8/2014

* cited by examiner

*Primary Examiner* — Kristy A Haupt
(74) *Attorney, Agent, or Firm* — McGinn I.P. Law Group, PLLC

(57) ABSTRACT

A decorative lighting apparatus includes: a light source; an elongated outer lens; and a housing, wherein: the outer lens includes: a surface protrusion having a surface that is the light emitting surface and both sides; a back protrusion having a back and both sides; a first connection part, one end thereof in a short-side direction being connected to one side of the protrusions; and a second connection part, one end thereof in a short-side direction being connected to the other side of the protrusion; the housing is fixedly attached to the other end in the short-side direction of each of the first and second connection parts; the light source is arranged to be opposite to one section of the back protrusion; and a width of both sides of the surface protrusion is greater than a width of a surface of the surface protrusion.

10 Claims, 5 Drawing Sheets

DECORATIVE LIGHTING APPARATUS

CROSS-REFERENCE TO RELATED APPLICATION(S)

This application is based upon and claims the benefit of priority from Japanese Patent Application No. 2015-145535, filed on Jul. 23, 2015, the entire contents of which are incorporated herein by reference.

BACKGROUND

1. Field of the Invention

The present invention relates to a decorative lighting apparatus.

2. Description of the Related Art

In JP-A-2014-154298, a lighting apparatus for a vehicle is disclosed. The lighting apparatus includes a light source, a pillar-shaped light guide that causes emitting light from the associated light source to be incident into one end surface and then guides the light therein to emit the guided light towards a front of the lighting apparatus by a plurality of light controllers formed on a side thereof, and a lens disposed in front of the light guide. The lens has a thick convex part that has a rectangular shape in longitudinal section, guides the light emitted from the light guide and then emits the light to the front of the lighting apparatus. A front member is disposed in front of the lens to cover a connection part between the lens and the lamp body. The convex part is exposed from the front member.

According to JP-A-2014-154298, the light guide and the lens are separate structures and are arranged to be spaced apart from each other. Therefore, since some of the emitting light of the light guide is reflected from an incident surface of the lens and thereby all of the emitting light of the light guide may not be incident into the lens, the efficiency of utilizing the emitting light of the light source is lowered and consequently it is difficult to obtain bright illumination.

Further, since the light guide is visible from the outside of the lighting apparatus for the vehicle through the lens, the appearance of the lighting apparatus is undesirably poor.

Moreover, JP-A-2014-154298 is problematic in that it is necessary to separately manufacture the light guide and the lens and then assemble them, manufacturing cost is high.

SUMMARY

The present invention is intended to solve the above-mentioned problems, and an object of the invention is to provide a decorative lighting apparatus that has a good appearance, allows bright illumination, and incurs low cost.

In order to accomplish the object, inventors have eagerly examined and found the following aspects of the present invention.

According to a first aspect of the present invention, there is provided a decorative lighting apparatus, including: a light source; an elongated outer lens configured to guide radiation of the light source in an extending direction; and a housing that is provided to cover a back of a light emitting surface of the outer lens, wherein: the outer lens includes: a surface protrusion of a rectangular pillar shape having a surface that is the light emitting surface and both sides that act as a light reflecting surface; a back protrusion of a rectangular pillar shape having a back and both sides that act as a light reflecting surface; a first connection part of an elongated angle shape, one end of the first connection part in a short-side direction being connected to one side of the surface and back protrusions; and a second connection part of an elongated angle shape, one end of the second connection part in a short-side direction being connected to the other side of the surface and back protrusions; the housing is fixedly attached to the other end in the short-side direction of each of the first and second connection parts to cover in a liquid-tightly state; the light source is arranged to be opposite to one section of the back protrusion in an extending direction of the back protrusion; and a width of both sides of the surface protrusion is greater than a width of a surface of the surface protrusion, in a longitudinal section of the outer lens.

In the first aspect, the light guide and the lens are not separate structures as in JP-A-2014-154298, and the outer lens possesses the function of the light guide. Thus, in comparison with the case where the light guide and the lens are the separate structures, the efficiency of utilizing the emitting light of the light source is increased and consequently the bright illumination may be obtained. Further, it is unnecessary to separately manufacture and then assemble the light guide and the lens, so that it is possible to reduce manufacturing cost.

Further, in the first aspect, light source is arranged on the proximal end surface (light incident surface) that is one section in the extending direction of the back protrusion of the body part of the outer lens to be opposite to each other.

Therefore, when observing the light source from the surface (side when viewed from the front of the decorative lighting apparatus for the vehicle) of the surface protrusion that is the light emitting surface of the outer lens, the proximal end surface located at an inner position than the surface protrusion acts as the reflective surface, and the light source are not visible.

Consequently, the light source is not uglily exposed, thus preventing the appearance of the decorative lighting apparatus 10 for the vehicle from being marred.

Since the respective connection parts are connected to the sides of the respective protrusions, the respective connection parts are located at an inner position. Further, both sides of the respective protrusions act as the light reflecting surface. Thus, it is difficult to view one ends (portions of the respective connection parts connected to the respective protrusions) of the respective connection parts from the surface of the surface protrusion. Consequently, one ends of the respective connection parts are not uglily exposed, thus preventing the appearance of the decorative lighting apparatus for the vehicle from being marred.

Further, in the first aspect, in the longitudinal section of the outer lens, the width of both sides of the surface protrusion is greater than the width of the surface of the surface protrusion. Further, both sides of the surface protrusion act as the light reflecting surface that reflects light, diffused and reflected from the back protrusion, towards the surface of the surface protrusion. Therefore, light emitted from the surface of the surface protrusion is narrow in width and thus sharp. It is difficult to irradiate the emitting light onto peripheral member located on the front of the outer lens so that aesthetically good results are achieved.

Further, in the first aspect, light incident into the outer lens repeats the internal reflection between both sides of the respective protrusions, so that the light is guided in the extending direction of the outer lens, is reflected from the back of the back protrusion and is emitted from the surface of the surface protrusion. Therefore, the emitting light becomes the uniform light of the band shape in the extending direction of the outer lens. Consequently, it is possible to provide the good appearance to the decorative lighting apparatus for the vehicle.

Further, in the first aspect, in order to render the surface protrusion to have the rectangular pillar shape, both edges of the surface of the surface protrusion in the short-side direction become corner parts. Since the guided light concentrates on the corner parts, the corner parts are formed like lines and it is possible to obtain so-called "light-emission embodiment in which the edge takes effects". Consequently, it is possible to provide the good appearance to the decorative lighting apparatus for the vehicle.

A second aspect of the present invention provides the decorative lighting apparatus according to the first aspect, wherein the width of both sides of the surface protrusion is greater than a width of both sides of the back protrusion, in the longitudinal section of the outer lens.

In the second aspect, light reflected irregularly from the back of the back protrusion and light reflected irregularly from one ends (portions of the respective connection parts connected to the respective protrusions) of the respective connection parts are reflected from both sides of the surface protrusion having a large protruding width, so that it is possible to efficiently guide light to the surface of the surface protrusion that is the light emitting surface, the quantity of the emitting light of the outer lens is increased, and thereby it is possible to obtain bright illumination.

A third aspect of the present invention provides the decorative lighting apparatus according to the first aspect or the second aspect, wherein a width of the surface of the surface protrusion is greater than a width of one end of each of the connection parts, in the longitudinal section of the outer lens.

In the third aspect, since the width of one ends of the respective connection parts is reduced, this may prevent the respective connection parts from inhibiting the guide of light into the outer lens, and may increase the quantity of the emitting light of the outer lens. Consequently, it is possible to obtain bright illumination.

A fourth aspect of the present invention provides the decorative lighting apparatus according to any one of the first, second and third aspects, wherein a distal end of the outer lens in the extending direction of the outer lens is curved towards one side in each of the protrusions.

In the fourth aspect, since both sides of the respective protrusions act as the light reflecting surface, even if the distal end of the outer lens is curved towards one side of the respective protrusions, it is possible to prevent the curved shape from inhibiting the guide of light into the outer lens. By appropriately setting the curved shape of the distal end of the outer lens, it allows the outer lens to be attractively exposed and thus aesthetically good results are achieved.

A fifth aspect of the present invention provides the decorative lighting apparatus according to any one of the first, second, third and fourth aspects, wherein the housing includes a first light blocking part that covers both sides in the vicinity of the back of the back protrusion to block light.

In the fifth aspect, since the first light blocking part covers both sides in the vicinity of the back of the back protrusion, easily undergoing diffused reflection, to block the light, it is possible to prevent stray light from being generated on both sides in the vicinity of the back of the back protrusion and to prevent the appearance of the emitting light of the outer lens from being marred due to the stray light.

A sixth aspect of the present invention provides the decorative lighting apparatus according to any one of the first, second, third, fourth and fifth aspects, wherein the housing includes a second light blocking part that covers both sides of the other end of each of the connection parts to block light.

In the sixth aspect, it is possible to prevent light guided into the respective connection parts from being diffused and reflected from the other ends of the respective connection parts and then becoming stray light, thus preventing the appearance of the emitting light of the outer lens from being impaired by the stray light.

A seventh aspect of the present invention provides the decorative lighting apparatus according to any one of the first, second, third, fourth and fifth aspects, further including: a decoration member having an installation hole, wherein the surface of the surface protrusion is exposed from the installation hole.

In the seventh aspect, it is possible to prevent the light emitted from the surface of the surface protrusion from being disrupted by the decoration member.

Further, since the periphery of the installation hole in the decoration member appears to rise up like a line by the emitting light from the surface of the surface protrusion, it is possible to allow the decoration member to be attractively exposed. Consequently, aesthetically good results are achieved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
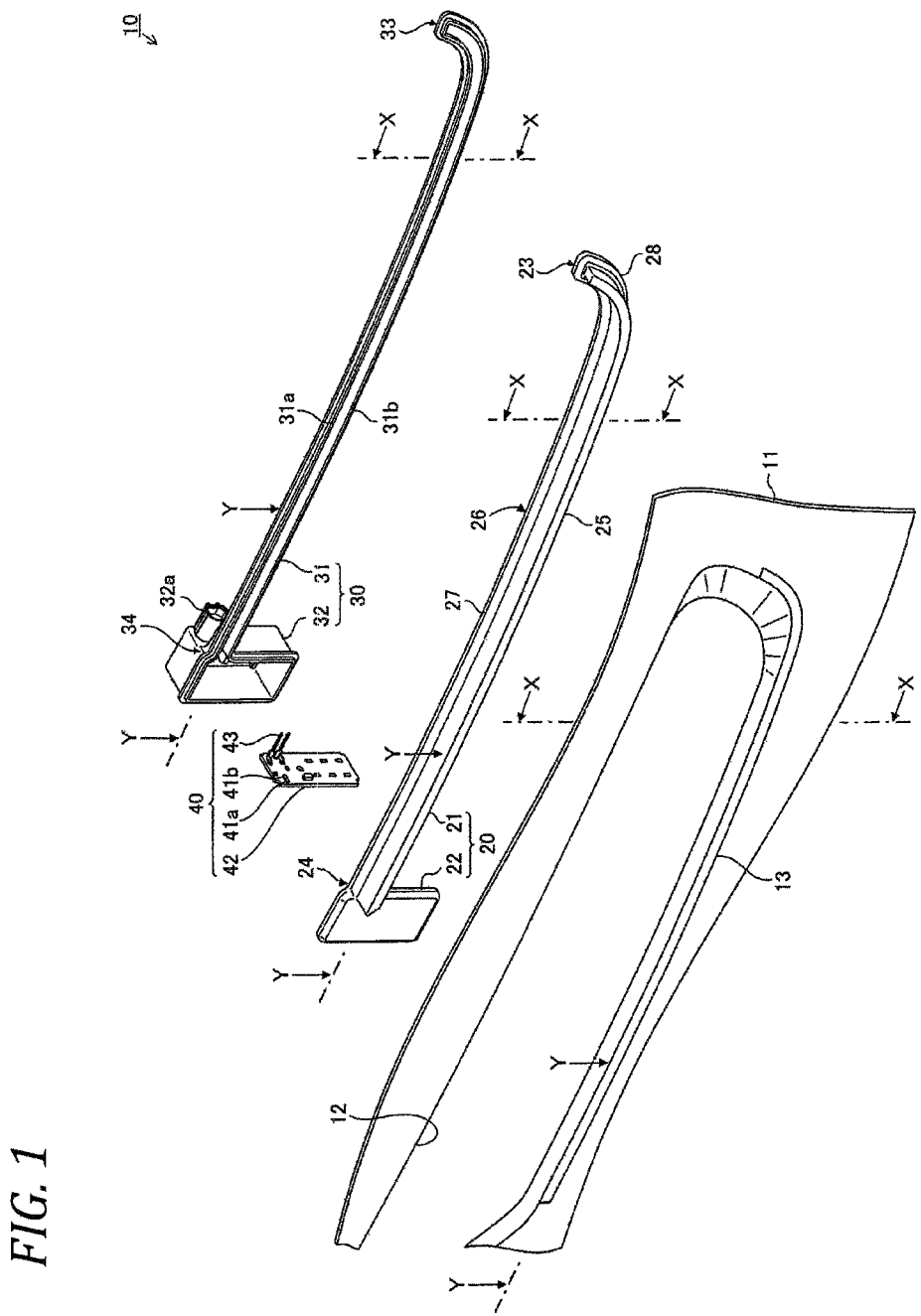
FIG. 1 is an exploded perspective view illustrating essential parts of a decorative lighting apparatus for a vehicle according to a first embodiment embodying the present invention.

Hereinafter, respective embodiments embodying the present invention will be described with reference to the accompanying drawings. Further, in the respective embodiments, like reference numerals refer to like constitution members and components throughout, and a duplicated description of the same contents will be omitted herein.

In the respective drawings, in order to make the invention easily understood, the dimensions, shapes and arrangement places of the constitution members of the respective embodiments are exaggerated and schematically illustrated, and may not be the same as the actual dimensions, shapes and arrangement places of the constitution members.

Figure 2:
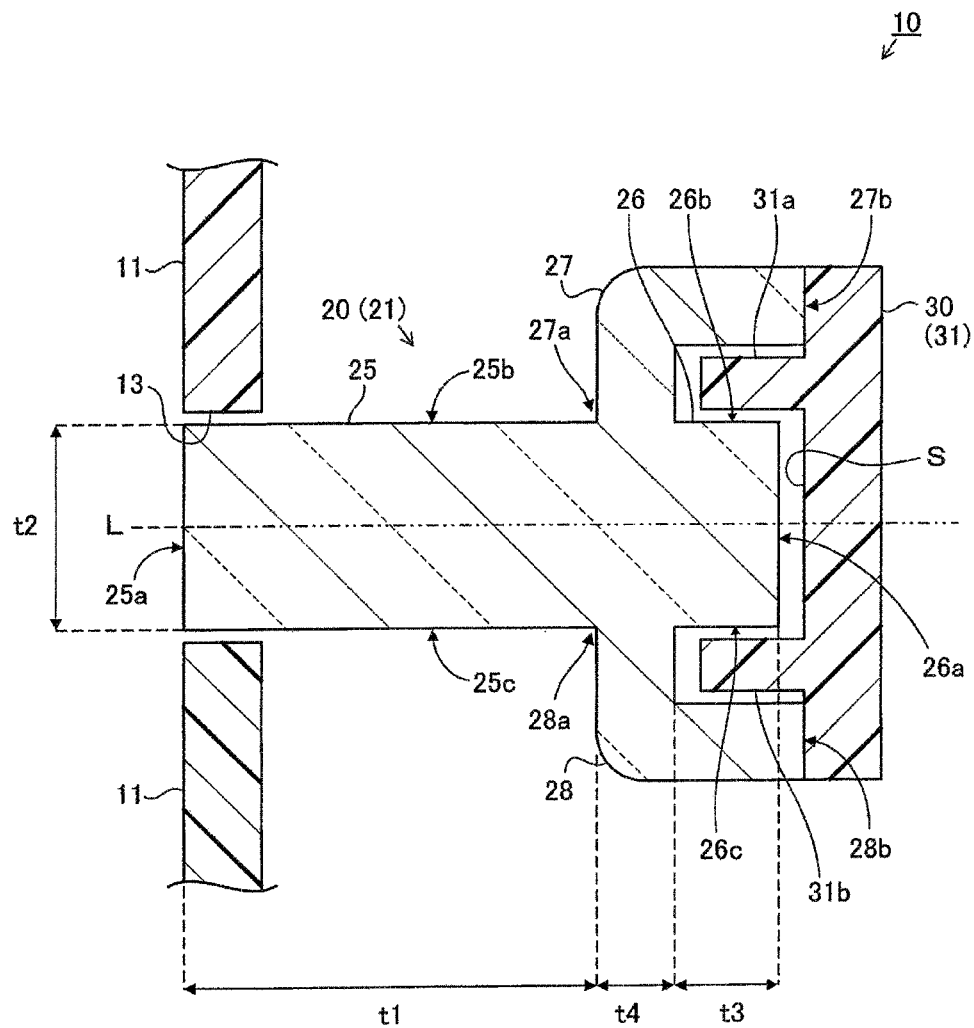
FIG. 2 is a sectional view illustrating a longitudinal section of the decorative lighting apparatus for the vehicle (sectional view taken along arrow X-X of FIG. 1)
Figure 3:
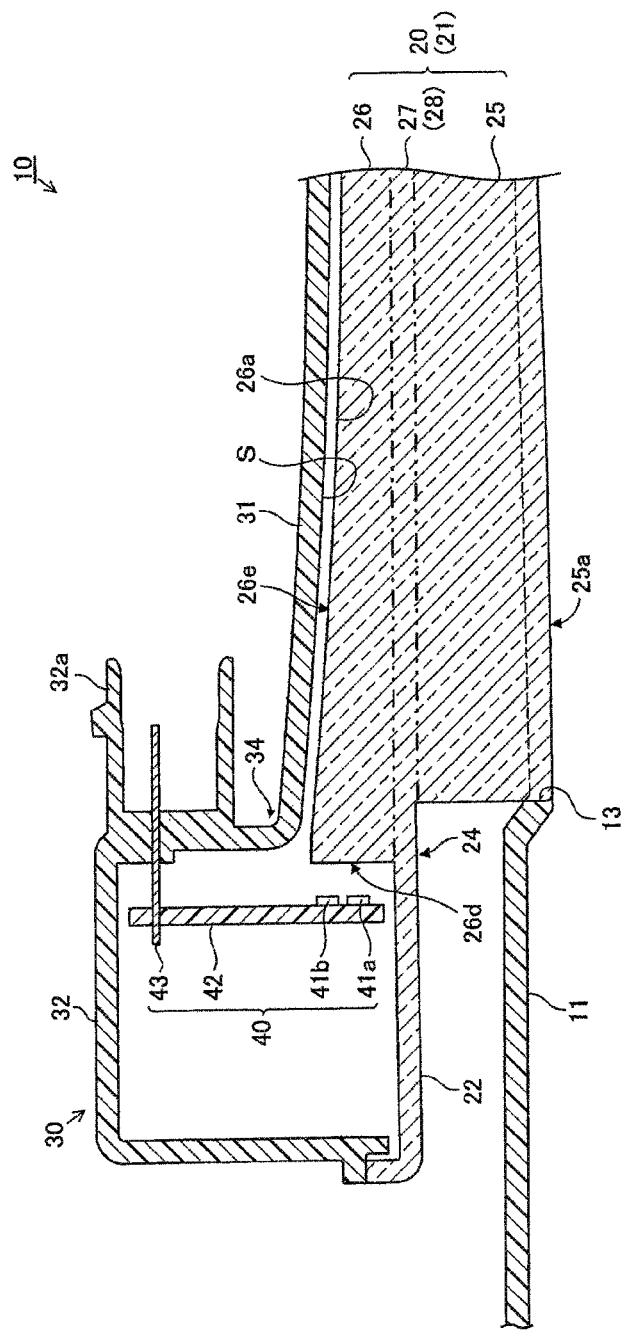
FIG. 3 is a sectional view illustrating a sectional view of a transverse section illustrating the decorative lighting apparatus for the vehicle (sectional view taken along arrow Y-Y of FIG. 1)

As illustrated in FIGS. 1 to 3, a decorative lighting apparatus 10 for a vehicle according to a first embodiment includes a front grill 11, a grill opening 12, an installation hole 13, an outer lens 20, a body part 21, a cover part 22, a distal end 23, a proximal end 24, a surface protrusion 25 (surface 25a, sides 25b and 25c), a back protrusion 26 (back 26a, sides 26b and 26c, proximal end surface 26d, light introduction part 26e), a first connection part 27 (one end 27a, the other end 27b), a second connection part 28 (one end 28a, the other end 28b), a housing 30, a body part 31 (projections 31a and 31b), an accommodation part 32 (connector 32a), a distal end 33, a proximal end 34, a light source 40, LEDs 41a and 41b, a wiring board 42, a connection terminal 43, a cavity S and the like.

The front grill (radiator grill) 11 has the shape of an elongated plate that is long laterally and forms a design surface of a front portion of a vehicle, and has a bilateral symmetric structure when viewed from a front.

A radiator (not illustrated) is disposed on a rear side (back) of the front grill 11, and an engine room (not illustrated) is formed on a rear side of the radiator.

The grill opening 12 and the installation hole 13 are formed in the front grill 11.

The grill opening 12 is a laterally long through-hole adapted to the dimension and the shape of the front grill 11, and is formed to take outside air in an engine room.

The installation hole 13 is a through hole having the shape of an elongated slit, and is arranged along a lower edge of the grill opening 12.

The outer lens 20 is provided with a body part 21 and a cover part 22 and has transmittance. The body part 21 is provided with the distal end 23 and the proximal end 24. The body part 21 is provided with the surface protrusion 25, the back protrusion 26, and the connection parts 27 and 28 (leg part, seal foot).

The body part 21 is an elongated object. The distal end 23 is shaped to be bent along a right edge when viewed from the front of the grill opening 12, and the proximal end 24 is connected to the substantially plate-shaped cover part 22.

The surface protrusion 25 has the shape of a rectangular pillar (shape of a rectangular longitudinal section), the surface (distal end surface) 25a and both sides 25b and 25c of the surface protrusion 25 are flat surfaces, and both sides 25b and 25c are arranged to be opposite to each other.

The back protrusion 26 has a rectangular pillar shape, the back 26a and both sides 26b and 26 of the back protrusion 26 are flat surfaces, and both sides 26b and 26c are arranged to be opposite to each other.

The proximal end surface 26d of the back protrusion 26 is a flat surface, and is formed on a section of the proximal end 24 to be connected to the cover part 22.

A part of the back protrusion 26 connected to the proximal end surface 26d is the light introduction part 26e. As the light introduction part 26e approaches the proximal end surface 26d, the width of the back protrusion 26 in the protruding direction is increased (see FIG. 3).

The distal end 23 is bent towards the upper sides 25b and 26b of the respective protrusions 25 and 26. The surface protrusion 25 is formed to correspond to the dimension and the shape of the installation hole 13 of the front grill 11.

The connection part 27 has an elongated angle shape (L-shaped material shape, L-shaped longitudinal section). One end 27a of the connection part 27 in a short-side direction thereof is connected to the upper sides 25b and 26b of the respective protrusions 25 and 26, and a flat surface is formed on a front of the other end 27b of the connection part 27 in the short-side direction thereof.

The connection part 28 has an elongated angle shape. One end 28a of the connection part 28 in a short-side direction thereof is connected to the lower sides 25c and 26c of the respective protrusions 25 and 26, and a flat surface is formed on a front of the other end 28b of the connection part 28 in the short-side direction thereof.

The upper sides 25b and 26b of the respective protrusions 25 and 26 are placed on the same plane, and the lower sides 25c and 26c of the respective protrusions 25 and 26 are placed on the same plane. The connection parts 27 and 28 have a line symmetrical shape with respect to a central line L of each protrusion 25, 26 in an up-down direction (see FIG. 2). That is, each protrusion 25, 26 generally has the rectangular pillar shape. The respective connection parts 27 and 28 protrude from the middles of the sides 25b and 25c and the sides 26b and 26c, which are two opposite sides of each rectangular pillar.

The respective connection parts 27 and 28 are integrally connected to surround the distal end 23 of the body part 21 of the outer lens 20.

The housing 30 includes the body part 31 and the accommodation part 32 to have a light blocking effect. The body part 31 is provided with the distal end 33 and the proximal end 34.

The body part 31 of the housing 30 has an elongated plate shape that corresponds to the dimension and the shape of the body part 21 of the outer lens 20. The proximal end 34 of the body part 31 is connected to the accommodation part 32, and each of the projections 31a and 31b having the rectangular pillar shape protrudes from a surface of the body part 31.

The respective projections 31a and 31b are arranged to be parallel to an extending direction of the body part 31, and are integrally connected to surround the distal end 33 of the body part 31.

The accommodation part 32 has the shape of a rectangular parallelepiped box that is open at a surface thereof, and an opening of the accommodation part 32 is formed to correspond to the dimension and the shape of the cover part 22 of the outer lens 20. The barrel-shaped connector 32a protrudes from the accommodation part 32.

The light source 40 includes the LEDs (Light Emitting Diodes) 41a and 41b, the wiring board 42, the connection terminal 43, and various circuit elements (resistor, capacitor, diode, Zener diode).

The respective LEDs 41a and 41b are mounted on the wiring board 42. The connection terminal 43 composed of two leading wires is inserted in a plane direction of the wiring board 42. The LEDs 41a and 41b and the connection terminal 43 are connected via a lighting circuit (not illustrated) formed on the wiring board 42 by various circuit elements.

The front grill 11 and the housing 30 are integrally formed, by injection molding, using a synthetic resin material having sufficient strength. Examples of the synthetic resin material include ASA (Acrylate Styrene Acrylonitrile), AES (Acrylonitrile Ethylene Styrene), ABS (Acrylonitrile Butadiene Styrene), PC (Polycarbonate) and the like.

Among these synthetic resin materials, ASA is most preferable since it is inexpensive and excellent in injection moldability and weather resistance.

The outer lens 20 is integrally formed, by injection molding, using a synthetic resin material having sufficient transmittance and strength. Examples of the synthetic resin material include PMMA (Polymethyl methacrylate), PC, PC/ABS alloy and the like.

Among these synthetic resin materials, PMMA is most preferable since it is high in transparency and excellent in injection moldability.

In the outer lens 20, the respective sides 25b, 25c, 26b and 26c of the respective protrusions 25 and 26 and the back 26a of the back protrusion 26 are light reflecting surfaces having sufficient light reflectability.

Since the respective sides 25b, 25c, 26b and 26c of the respective protrusions 25 and 26 use total reflection by an interface, for example, a method of flattening an associated surface, a method of using a material of a high refractive index as a material forming the outer lens 20 and the like are adopted so as to increase the light reflectability.

Further, the following methods are adopted so as to increase the light reflectability of the back 26a of the back protrusion 26.

[A] A method of forming the back 26a into a serrated shape having a plurality of notches each having a triangular section in a direction parallel to the short-side direction of the outer lens 20.

[B] A method of boring a groove in the back 26a in the extending direction of the outer lens 20.

[C] A method of performing a fine unevenness process (for example, embossing process, blast process or the like) on the back 26a.

[D] A method of performing white printing having high light reflectability on the back 26a.

[E] A method of forming a light-reflective thin film of a metal material (for example, tin, silver, gold, chromium or the like), formed by a PVD (Physical Vapor Deposition) method or a plating method, on the back 26a.

[F] A method of containing fine particles of a material (for example, silica, titanium oxide, aluminum oxide or the like) having high light scattering properties in a material forming the outer lens 20, and scattering light by the fine particles.

In order to assemble the decorative lighting apparatus 10 for the vehicle, first, the light source 40 is accommodated in the accommodation part 32 of the housing 30, and the connection terminal 43 of the light source 40 protrudes into the connector 32a of the housing 30.

Next, the outer lens 20 is attached to the housing 30 to be integrated therein.

That is, the other ends 27b and 28b of the respective connection parts 27 and 28 of the outer lens 20 are liquid-tightly secured to the body part 31 of the housing 30 to come into close contact therewith. Simultaneously, the cover part 22 of the outer lens 20 is liquid-tightly secured to the opening of the accommodation part 32 of the housing 30 to come into close contact therewith, thus realizing a waterproof structure of the light source 40.

In this respect, the method of fixedly attaching the outer lens 20 to the housing 30 may employ any fixing methods as long as it is possible to attain a good liquid-tight state. For example, various welding methods (ultrasonic welding, vibratory welding, induction welding, high-frequency welding, laser welding, thermal welding using a heater and the like), adhesion using an adhesive, fixing using double-side adhesive tape, screw fixing and the like may be employed.

Furthermore, a cavity (air layer) S is formed between the back 26a of the back protrusion 26 of the outer lens 20 and the body part 31 of the housing 30.

In the state where the surface protrusion 25 of the outer lens 20 is inserted from the back of the front grill 11 to the installation hole 13 of the front grill 11, and the surface of the front grill 11 and the surface 25a of the surface protrusion 25 are arranged to be approximately flush with each other, an integrated structure of the housing 30 with the outer lens 20 is fixedly secured to the back of the front grill 11.

In this respect, the method of fixedly attaching the integrated structure of the housing 30 with the outer lens 20 to the front grill 11 may employ any fixing methods as long as it is possible to attain a good fixing state. For example, adhesion using an adhesive, fixing using double-side adhesive tape, fixing using a mounting bracket (not illustrated), fixing using mounting claws formed on the housing 30 or the outer lens 20 may be employed.

Thereafter, a male-side connector (not illustrated) of a wire harness of the vehicle is fixedly inserted into the connector 32a of the housing 30. The male-side connector is electrically connected to the connection terminal 43 in the connector 32a. Thereby, power is supplied from the vehicle to the light source 40 to turn on the LEDs 41a and 41b.

FIG. 1 illustrates a right-half part of the front grill 11 when viewed from a front. In a left-half part of the front grill 11 that is not illustrated when viewed from the front, an installation hole is formed to be symmetric with the installation hole 13 in a left-right direction of the front grill 11.

Further, a member that is symmetric with the above-mentioned members (the outer lens 20, the housing 30, and the light source 40) of the decorative lighting apparatus 10 for the vehicle in the left-right direction of the front grill 11 is fixedly attached to the installation hole that is symmetric with the installation hole 13.

The radiation of the respective LEDs 41a and 41b of the light source 40 is incident into the proximal end surface 26d of the back protrusion 26 of the outer lens 20 as a light incident surface.

The light incident into the outer lens 20 repeats internal reflection between both sides 25b and 25c of the surface protrusion 25 of the outer lens 20, and simultaneously repeats internal reflection between both sides 26b and 26c of the back protrusion 26, thus guiding light in the extending direction of the outer lens 20 that functions as a light guide.

That is, each side 25b, 25c, 26b, or 26c functions as a light reflecting surface for guiding light into the outer lens 20.

In this respect, the respective LEDs 41a and 41b mounted on the wiring board 42 are arranged along the protruding direction of the back protrusion 26. The radiation of the respective LEDs 41a and 41b is efficiently incident into the proximal end surface 26d of the back protrusion 26.

As the light introduction part 26e of the back protrusion 26 approaches the proximal end surface 26d, the width of the back protrusion 26 in the protruding direction is increased.

For this reason, the radiation of the respective LEDs 41a and 41b is smoothly guided into the outer lens 20 through the light introduction part 26e of the back protrusion 26.

Since an optic axis of the LED 41b disposed on the back 26a of the back protrusion 26 intersects with a portion of the back 26a that is close to the proximal end surface 26d, and an optic axis of the LED 41a intersects with a portion of the back 26a that is distant from the proximal end surface 26d, the radiation of the respective LEDs 41a and 41b may be efficiently guided to the distal end 23 of the body part 21 of the outer lens 20, whereby light can be efficiently supplied.

The reason why two LEDs 41a and 41b are formed is because the quantity of incident light of the outer lens 20 is increased, the quantity of emitting light of the outer lens 20 is also increased and thereby bright illumination is obtained.

The light guided in the extending direction of the outer lens 20 is reflected from the back 26a of the back protrusion 26 as the light reflecting surface, and is emitted to the front of the front grill 11 from the surface 25a of the surface protrusion 25 as the light emitting surface. The emitting light becomes uniform light of a band shape in the extending direction of the outer lens 20.

The surface 25a of the surface protrusion 25 of the outer lens 20 is exposed from the installation hole 13 of the front grill 11, and the installation hole 13 is disposed along the lower edge of the grill opening 12 of the front grill 11.

Therefore, since the lower edge of the grill opening 12 appears to rise up like a line by the emitting light from the surface 25a of the surface protrusion 25, it is possible to realize the three-dimensional effect or the expansion in a vehicle-width direction of the grill opening 12 and thereby cause the grill opening 12 to be attractively exposed. Consequently, aesthetically good results are achieved.

The decorative lighting apparatus 10 for the vehicle according to the first embodiment may achieve the following effects.

[1] In the decorative lighting apparatus 10 for the vehicle, the light guide and the lens are not separate structures as in JP-A-2014-154298, and the outer lens 20 possesses the function of the light guide. Thus, in comparison with the case where the light guide and the lens are the separate structures, the efficiency of utilizing the emitting light of the respective LEDs 41a and 41b (light source) is increased and consequently the bright illumination may be obtained. Further, it is unnecessary to separately manufacture and then assemble the light guide and the lens, so that it is possible to reduce manufacturing cost.

[2] The respective LEDs 41a and 41b (light source) are arranged on the proximal end surface 26d (light incident surface) that is one section in the extending direction of the back protrusion 26 of the body part 21 of the outer lens 20 to be opposite to each other.

Therefore, when observing the respective LEDs 41a and 41b from the surface 25a (side when viewed from the front of the decorative lighting apparatus 10 for the vehicle) of the surface protrusion 25 that is the light emitting surface of the outer lens 20, the proximal end surface 26d located at an inner position than the surface protrusion 25 acts as the reflective surface, and the respective LEDs 41a and 41b are not visible.

Consequently, the respective LEDs 41a and 41b are not uglily exposed, thus preventing the appearance of the decorative lighting apparatus 10 for the vehicle from being marred.

Since the respective connection parts 27 and 28 are connected to the sides 25b, 25c, 26b and 26c of the respective protrusions 25 and 26, the respective connection parts 27 and 28 are located at an inner position. Further, both sides 25b, 25c, 26b and 26c of the respective protrusions 25 and 26 act as the light reflecting surface. Thus, it is difficult to view one ends 27a and 28a (portions of the respective connection parts 27 and 28 connected to the respective protrusions 25 and 26) of the respective connection parts 27 and 28 from the surface 25a of the surface protrusion 25.

Consequently, one ends 27a and 28a of the respective connection parts 27 and 28 are not uglily exposed, thus preventing the appearance of the decorative lighting apparatus 10 for the vehicle from being marred.

[3] As illustrated in FIG. 2, in the longitudinal section of the outer lens 20, the width t1 of both sides 25b and 25c of the surface protrusion 25 is greater than the width t2 of the surface 25a of the surface protrusion 25 (t1>t2).

Further, both sides 25b and 25c of the surface protrusion 25 act as the light reflecting surface that reflects light, diffused and reflected from the back protrusion 26, towards the surface 25a of the surface protrusion 25.

Therefore, light emitted from the surface 25a of the surface protrusion 25 is narrow in width and thus sharp. It is difficult to irradiate the emitting light onto the front grill 11 (peripheral member located on the front of the outer lens 20). A boundary between the front grill 11 and the outer lens 20 becomes clear. Consequently, it causes the outer lens 20 to be attractively exposed, so that aesthetically good results are achieved.

The width t1 of both sides 25b and 25c of the surface protrusion 25 is properly in the range of 5 to 20 mm, and preferably of 8 to 15 mm.

Further, the width t2 of the surface 25a of the surface protrusion 25 is properly in the range of 3 to 10 mm, and preferably of 4 to 7 mm.

Furthermore, a ratio of the width t1 to the width t2, t1/t2 is properly in the range of 1.5 to 4 mm, and preferably of 2 to 3 mm.

When t1/t2 is reduced below this range, the emitting light of the surface 25a of the surface protrusion 25 becomes too wide. Thus, it is difficult to obtain the above-described effects, and the brightness in the surface 25a is likely to be non-uniform.

In contrast, when t1/t2 is increased above this range, the outer lens 20 become too deep. This inhibits the size of the decorative lighting apparatus 10 for the vehicle from being reduced, increases an optical loss due to the reflection in both sides 25b and 25c of the surface protrusion 25, reduces the quantity of the emitting light from the surface 25a, and thus leads to dark illumination.

[4] Light incident into the outer lens 20 repeats the internal reflection between both sides 25b and 25c and both sides 26b and 26c of the respective protrusions 25 and 26, so that the light is guided in the extending direction of the outer lens 20, is reflected from the back 26a of the back protrusion 26 and is emitted from the surface 25a of the surface protrusion 25. Therefore, the emitting light becomes the uniform light of the band shape in the extending direction of the outer lens 20. Consequently, it is possible to provide the good appearance to the decorative lighting apparatus 10 for the vehicle.

[5] In order to render the surface protrusion 25 to have the rectangular pillar shape, both edges of the surface 25a of the surface protrusion 25 in the short-side direction become corner parts. Since the guided light concentrates on the corner parts, the corner parts are formed like lines and it is possible to obtain so-called "light-emission embodiment in which the edge takes effects". Consequently, it is possible to provide the good appearance to the decorative lighting apparatus 10 for the vehicle.

[6] As illustrated in FIG. 2, in the longitudinal section of the outer lens 20, the width t1 of both sides 25b and 25c of the surface protrusion 25 is greater than the width t3 of both sides 26b and 26c of the back protrusion 26 (t1>t3).

Therefore, light reflected irregularly from the back 26a of the back protrusion 26 and light reflected irregularly from one ends 27a and 28a (portions of the respective connection parts 27 and 28 connected to the respective protrusions 25 and 26) of the respective connection parts 27 and 28 are reflected from both sides 25b and 25c of the surface protrusion 25 having a large protruding width, so that it is possible to efficiently guide light to the surface 25a of the surface protrusion 25 that is the light emitting surface, the quantity of the emitting light of the outer lens 20 is increased, and thereby it is possible to obtain bright illumination.

Further, the width t3 of both sides 26b and 26c of the back protrusion 26 differs in a portion that is close to the proximal end surface 26d and a portion that is distant therefrom, and is properly in the range of 2 to 10 mm and preferably of 3 to 5 mm.

A ratio of the width t1 to the width t3, namely, t1/t3 is preferably in the range of 2 to 5.

When t1/t3 is reduced below this range, the width t3 becomes too large, so that it is difficult to obtain the above-mentioned effects. Further, the depth of the outer lens 20 becomes large. Thus, the decorative lighting apparatus 10 for the vehicle is increased in size, and one ends 27a and 28a of the respective connection parts 27 and 28 are likely to mar the appearance.

In contrast, when t1/t3 is increased above this range, the depth of the outer lens 20 becomes too large, so that this inhibits the size of the decorative lighting apparatus 10 for the vehicle from being reduced, increases an optical loss due to the reflection in both sides 25b and 25c of the surface protrusion 25, reduces the quantity of the emitting light from the surface 25a, and thus leads to dark illumination.

[7] As illustrated in FIG. 2, in the longitudinal section of the outer lens 20, the width t2 of the surface 25a of the surface protrusion 25 is greater than the width t4 of one ends 27a and 28a of the respective connection parts 27 and 28 (t2>t4).

That is, since the width t4 of one ends 27a and 28a of the respective connection parts 27 and 28 is reduced, this may prevent the respective connection parts 27 and 28 from inhibiting the guide of light into the outer lens 20, and may increase the quantity of the emitting light of the outer lens 20. Consequently, it is possible to obtain bright illumination.

Preferably, the width t4 of one ends 27a and 28a of the respective connection parts 27 and 28 is in the range of 1 to 3 mm.

A ratio of the width t2 to the width t4, t2/t4 is preferably in the range of 2 to 4.

When t2/t4 is reduced below this range, the width t4 becomes too large, so that it is difficult to obtain the above-mentioned effects. In addition, the proportion of light guided into the respective connection parts 27 and 28 is increased and the proportion of light guided into the respective connection parts 25 and 26 is correspondingly reduced. Consequently, this reduces the quantity of the emitting light of the outer lens 20, and lead to dark illumination.

Meanwhile, when t2/t4 is increased above this range, the width t4 becomes too small, so that it is impossible to obtain the sufficient strength of the respective connection parts 27 and 28 and one ends 27a and 28a of the respective connection parts 27 and 28 are likely to mar the appearance.

[8] The distal end 23 of the outer lens 20 in the extending direction thereof is curved towards the upper sides 25b and 26b of the respective protrusions 25 and 26.

That is, since both sides 25b, 25c, 26b and 26c of the respective protrusions 25 and 26 act as the light reflecting surface that guides light therebetween, even if the distal end 23 of the outer lens 20 is curved towards one side of the respective protrusions 25 and 26, it is possible to prevent the curved shape from inhibiting the guide of light into the outer lens 20. By appropriately setting the curved shape of the distal end 23 of the outer lens 20, it allows the outer lens 20 to be attractively exposed and thus aesthetically good results are achieved.

[9] Since the respective projections 31a and 31b (first light blocking part) protruding from the body part 31 of the housing 30 are formed integrally with the housing 30, they have a light blocking effect and cover both sides in the vicinity of the back 26a of the back protrusion 26 of the outer lens 20 to block light.

That is, since the respective projections 31a and 31b cover both sides in the vicinity of the back 26a of the back protrusion 26, easily undergoing diffused reflection, to block the light, it is possible to prevent stray light from being generated on both sides in the vicinity of the back 26a of the back protrusion 26 and to prevent the appearance of the emitting light of the outer lens 20 from being marred due to the stray light.

[10] Since the decorative lighting apparatus 10 for the vehicle includes the front grill 11 (decoration member) having the installation hole 13 and the surface 25a of the surface protrusion 25 of the outer lens 20 is exposed from the installation hole 13, it is possible to prevent light emitted from the surface 25a of the surface protrusion 25 from being inhibited by the front grill 11.

Since the periphery of the installation hole 13 appears to rise up like a line by the light emitted from the surface 25a of the surface protrusion 25, it is possible to allow the front grill 11 to be attractively exposed. Consequently, aesthetically good results are achieved.

[11] The cavity S is formed between the back 26a of the back protrusion 26 and the outer lens 20 and the body part 31 of the housing 30.

Therefore, since the light guided into the outer lens 20 may be reliably reflected from the back 26a of the back protrusion 26 by the total reflection due to a difference in refractive index between the outer lens 20 and the air in the cavity S, the quantity of the emitting light of the outer lens 20 may be increased and thereby the bright illumination may be obtained.

[12] Since the surface 25a of the surface protrusion 25 and the surface of the front grill 11 (decoration member) are arranged to be approximately flush with each other and the surface protrusion 25 does not protrude from the front grill 11, the surface protrusion 25 is not uglily exposed, thus preventing the appearance of the decorative lighting apparatus 10 for the vehicle from being marred by the surface protrusion 25.

[13] If the front grill 11 (decoration member) and the housing 30 have the same color, when the decorative lighting apparatus 10 for the vehicle does not emit light, the housing 30 is not visible from the outside through the outer lens 20, and it appears as if the decorative lighting apparatus 10 for the vehicle did not exist.

Figure 4:
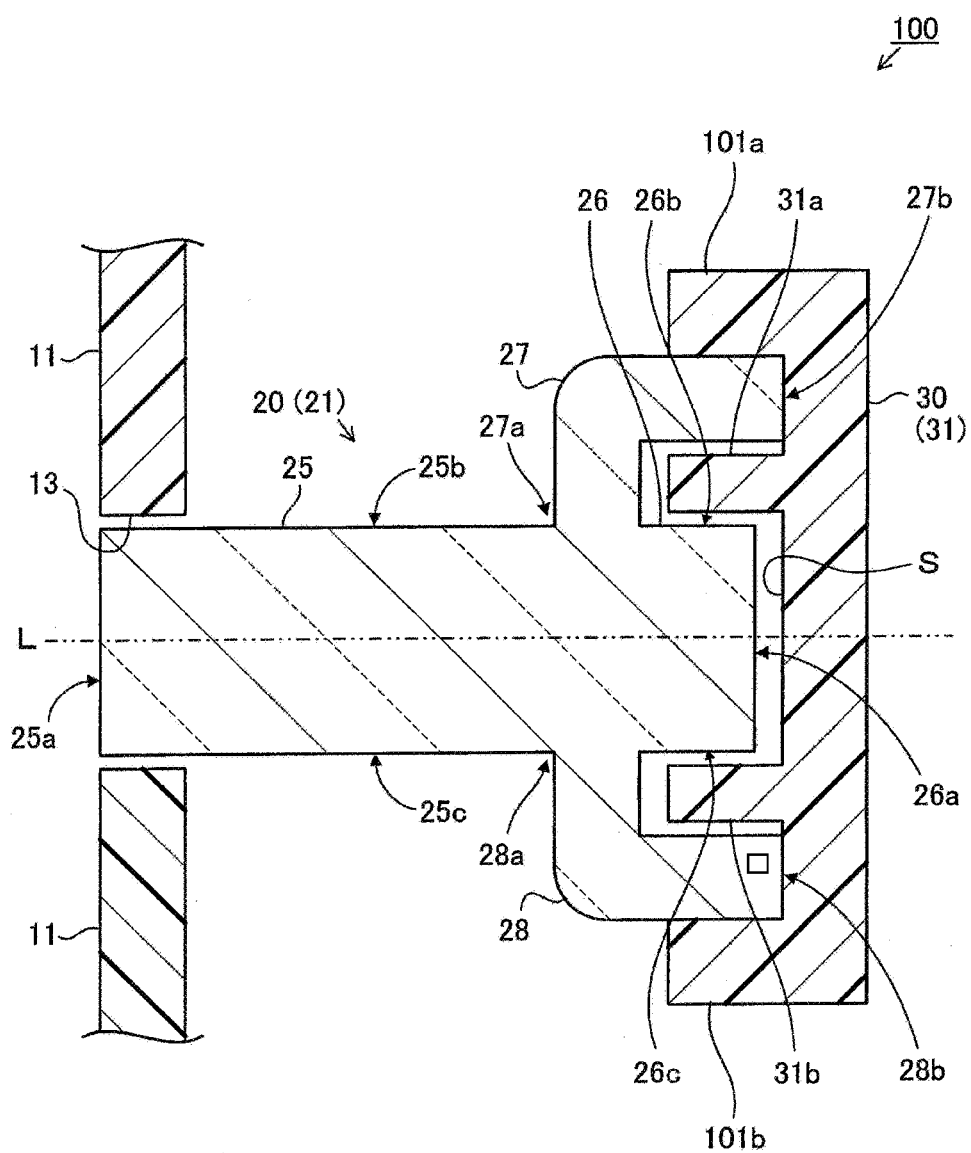
FIG. 4 is a sectional view illustrating a longitudinal section of a decorative lighting apparatus for a vehicle according to a second embodiment embodying the present invention.

As illustrated in FIG. 4, a decorative lighting apparatus 100 for a vehicle according to a second embodiment includes a front grill 11, a grill opening 12, an installation hole 13, an outer lens 20, a body part 21, a surface protrusion 25 (surface 25a, sides 25b and 25c), a back protrusion 26 (back 26a, sides 26b and 26c), a first connection part 27 (one end 27a, the other end 27b), a second connection part 28 (one end 28a, the other end 28b), a housing 30, a body part 31 (projections 31a and 31b), a cavity S, outer circumferential walls 101a and 101b and the like.

Although not illustrated in FIG. 4, the decorative lighting apparatus 100 for the vehicle according to the second embodiment includes the same members as other members of the decorative lighting apparatus 10 for the vehicle according to the first embodiment.

The decorative lighting apparatus 100 for the vehicle according to the second embodiment is different from the decorative lighting apparatus 10 for the vehicle according to the first embodiment in that the body part 31 of the housing 30 includes the outer circumferential walls 101a and 101b.

Therefore, the second embodiment may obtain the same effects as the first embodiment.

The outer circumferential walls 101a and 101b protrude from the outer circumference of the same plane as the plane of the body part 31 from which the projections 31a and 31b protrude, and are integrally connected to surround the distal end (not illustrated. See the distal end 23 of FIG. 1) of the body part 31.

Since the outer circumferential wall 101a and the projection 31a (second light blocking part) are formed integrally with the housing 30, they have a light blocking effect and cover both sides of the other end 27b of the first connection part 27 to block light.

Further, since the outer circumferential wall 101b and the projection 31b (second light blocking part) are formed integrally with the housing 30, they have a light blocking effect and cover both sides of the other end 28b of the second connection part 28 to block light.

In this respect, since the other ends 27b and 28b of the respective connection parts 27 and 28 are fixed to the body part 31 of the housing 30 to come into close contact therewith, it is easy to diffuse and reflect the light when the above-mentioned fixing methods (various welding methods, adhesion using an adhesive, and fixing using double-side adhesive tape) are used for the fixing.

However, the second embodiment may prevent light guided into the respective connection parts 27 and 28 from being diffused and reflected from the other ends 27b and 28b of the respective connection parts 27 and 28 and then becoming stray light, thus preventing the appearance of the emitting light of the outer lens 20 from being impaired by the stray light.

Figure 5:
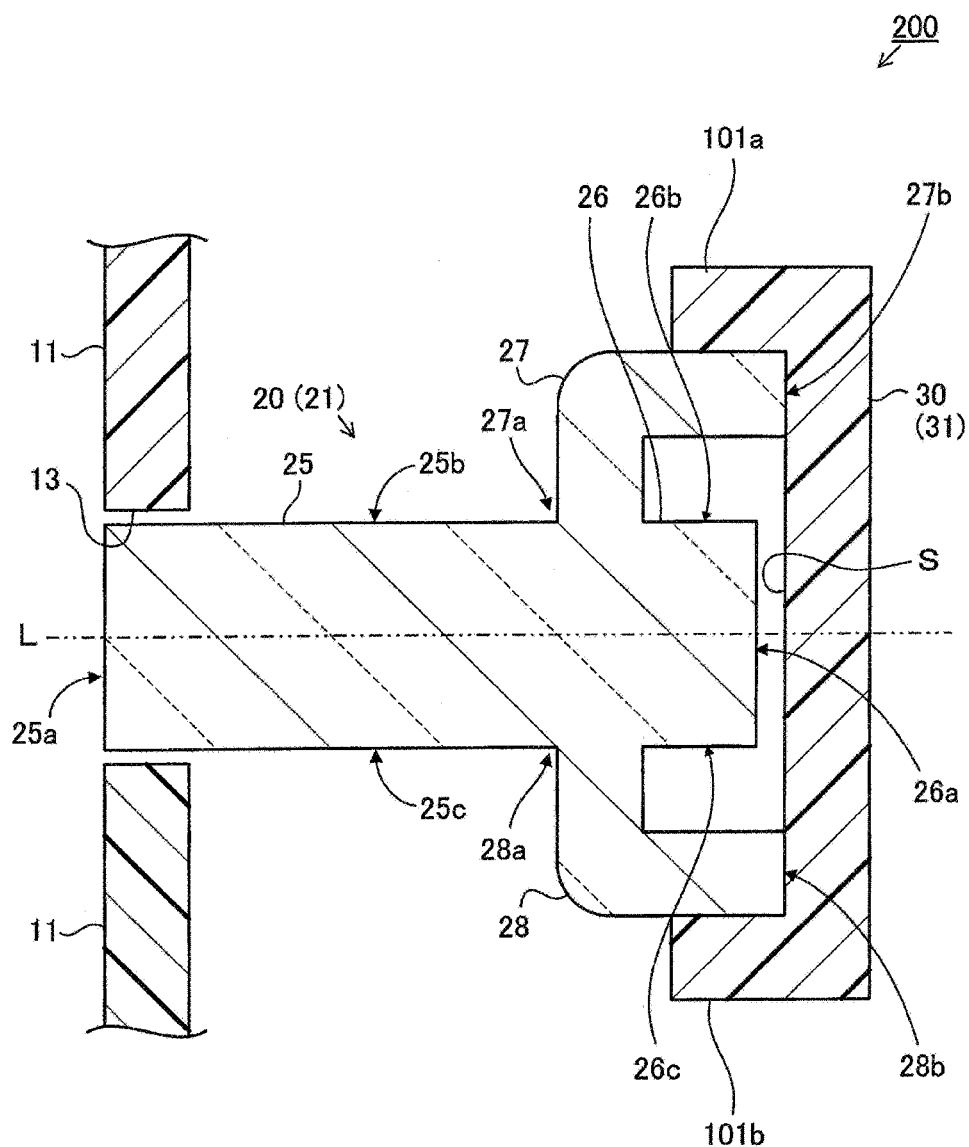
FIG. 5 is a sectional view illustrating a longitudinal section of a decorative lighting apparatus for a vehicle according to a third embodiment embodying the present invention.

As illustrated in FIG. 5, a decorative lighting apparatus 200 for a vehicle according to a third embodiment includes a front grill 11, a grill opening 12, an installation hole 13, an outer lens 20, a body part 21, a surface protrusion 25 (surface 25a, sides 25b and 25c), a back protrusion 26 (back 26a, sides 26b and 26c), a first connection part 27 (one end 27a, the other end 27b), a second connection part 28 (one end 28a, the other end 28b), a housing 30, a body part 31, a cavity S, outer circumferential walls 101a and 101b and the like.

Although not illustrated in FIG. 5, the decorative lighting apparatus 200 for the vehicle according to the third embodiment includes the same members as other members of the decorative lighting apparatus 10 for the vehicle according to the first embodiment.

The decorative lighting apparatus 200 for the vehicle according to the third embodiment is different from the decorative lighting apparatus 100 for the vehicle according to the second embodiment in that the projections 31a and 31b are removed from the body part 31 of the housing 30.

Therefore, the third embodiment may obtain the effects of [1] to [8] and [10] to [13] of the first embodiment.

The outer circumferential wall 101a (second light blocking part) covers the outer side of the other end 27b of the first connection part 27 to block light.

Further, the outer circumferential wall 101b (second light blocking part) covers the outer side of the other end 28b of the second connection part 28 to block light. Therefore, since the third embodiment has no projections 31a and 31b, it is inferior but may obtain the same effects as the second embodiment.

The present invention may be embodied as follows without being limited to the above-mentioned embodiments. In this case, it is possible to obtain the same or more effects in comparison with the above-mentioned embodiments.

[A] Although two LEDs 41a and 41b are formed in the above-described embodiments, they may be substituted with one LED as long as a sufficient quantity of light is obtained, and three or more LEDs may be formed.

[B] The LED 41a, 41b may be substituted with any light source (for example, bulb, semiconductor light emitting element such as EL (Electro Luminescence) or LD (Laser Diode)) as long as it has an optic axis.

[C] Although the decorative lighting apparatuses 10, 100 and 200 for the vehicle according to the above-described embodiments are applied to an illumination of the front grill 11, they may be applied to an illumination of any decorated member (for example, bumper, fender, emblem or the like) provided on an interior or exterior of the vehicle.

Further, the present invention may be applied to a decorative lighting apparatus of a decoration member provided on any article (for example, electronic product, furniture or the like) without being limited to the decorative lighting apparatus for the vehicle.

Technical spirits that may be understood from the above-described embodiments and other embodiments will be described in the following.

[Note 1] A decorative lighting apparatus for a vehicle described in any one of first to seventh aspects, wherein a cavity is formed between a back of a back protrusion and a housing.

In Note 1, since light guided into an outer lens may be reliably reflected from the back of the back protrusion by total reflection due to a difference in refractive index between the outer lens and the air in the cavity, the quantity of the emitting light of the outer lens may be increased and thereby bright illumination may be obtained.

[Note 2] A decorative lighting apparatus for a vehicle described in any one of first to seventh aspects or Note 1, wherein a surface of a surface protrusion and a surface of a decoration member are arranged to be approximately flush with each other.

In Note 2, since the surface protrusion does not protrude from the decoration member, the surface protrusion is not uglily exposed, thus preventing the appearance of the decorative lighting apparatus for the vehicle from being marred by the surface protrusion.

[Note 3] A decorative lighting apparatus for a vehicle described in seventh aspect, wherein a decoration member and a housing have the same color.

In Note 3, when the decorative lighting apparatus does not emit light, the housing is not visible from the outside through an outer lens, and it appears as if the decorative lighting apparatus did not exist.

The present invention is not restricted to the above-described aspects, embodiments, and Notes. It is apparent to those skilled in the art that various modifications may be included in the present invention without departing from the above-described aspects, embodiments, Notes, and claims. Reference is made to the above Patent Documents, the contents of which are incorporated herein.

What is claimed is:
1. A decorative lighting apparatus, comprising:
a light source;
an elongated outer lens configured to guide radiation of the light source in an extending direction;
a light guide formed integrally with the outer lens such that the light is guided in the extending direction of the outer lens; and
a housing that is provided to cover a back of a light emitting surface of the outer lens, wherein:
the integrally formed outer lens and light guide includes:

a surface protrusion of a rectangular pillar shape having a surface that is the light emitting surface and both sides that act as a light reflecting surface;

a back protrusion of a rectangular pillar shape having a back and both sides that act as a light reflecting surface;

a first connection part of an elongated angle shape, one end of the first connection part in a short-side direction being connected to one side of the surface and back protrusions; and a second connection part of an elongated angle shape, one end of the second connection part in a short-side direction being connected to the other side of the surface and back protrusions;

the housing is fixedly attached to the other end in the short-side direction of each of the first and second connection parts to cover in a liquid-tightly state;

the light source is arranged to be opposite to one section of the back protrusion in an extending direction of the back protrusion; and a width of both sides of the surface protrusion is greater than a width of a surface of the surface protrusion, in a longitudinal section of the outer lens.

2. The decorative lighting apparatus according to claim 1, wherein the width of both sides of the surface protrusion is greater than a width of both sides of the back protrusion, in the longitudinal section of the outer lens.

3. The decorative lighting apparatus according to claim 1, wherein a width of the surface of the surface protrusion is greater than a width of one end of each of the connection parts, in the longitudinal section of the outer lens.

4. The decorative lighting apparatus according to claim 1, wherein a distal end of the outer lens in the extending direction of the outer lens is curved towards one side in each of the protrusions.

5. The decorative lighting apparatus according to claim 1, wherein the housing includes a first light blocking part that covers both sides in the vicinity of the back of the back protrusion to block light.

6. The decorative lighting apparatus according to claim 1, wherein the housing includes a second light blocking part that covers both sides of the other end of each of the connection parts to block light.

7. The decorative lighting apparatus according to claim 1, further comprising:

a decoration member having an installation hole, wherein the surface of the surface protrusion is exposed from the installation hole.

8. The decorative lighting apparatus according to claim 1, wherein the light guide and the outer lens are not separate structures.

9. The decorative lighting apparatus according to claim 1, wherein the outer lens possesses the function of the light guide by integrally forming the light guide and the outer lens.

10. The decorative lighting apparatus according to claim 1, wherein the light guided into the outer lens is reflected from the back of the back protrusion by a total reflection due to a difference in refractive index between the outer lens and air in a cavity between the back protrusion and the housing.

* * * * *